US012782987B2

(12) United States Patent
Feng et al.

(10) Patent No.: US 12,782,987 B2
(45) Date of Patent: Nov. 3, 2026

(54) REGULATOR CIRCUIT

(71) Applicant: Realtek Semiconductor Corporation, Hsinchu (TW)

(72) Inventors: Yi Feng, Hsinchu (TW); Chuan Chu Liu, Hsinchu (TW); Yi-Shao Chang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 125 days.

(21) Appl. No.: 19/032,107

(22) Filed: Jan. 19, 2025

(65) Prior Publication Data

US 2026/0104722 A1 Apr. 16, 2026

(30) Foreign Application Priority Data

Oct. 16, 2024 (TW) ................................ 113139417

(51) Int. Cl.
*G05F 1/56* (2006.01)
*G05F 1/575* (2006.01)
*G05F 1/59* (2006.01)

(52) U.S. Cl.
CPC ................ *G05F 1/56* (2013.01); *G05F 1/575* (2013.01); *G05F 1/59* (2013.01)

(58) Field of Classification Search
CPC ............... G05F 1/56; G05F 1/575; G05F 1/59
See application file for complete search history.

(56) References Cited

U.S. PATENT DOCUMENTS

2017/0315574 A1* 11/2017 Brown .................... G05F 1/468
2023/0045744 A1* 2/2023 Jung ....................... G05F 1/575

FOREIGN PATENT DOCUMENTS

CN 111414040 A 7/2020

OTHER PUBLICATIONS

Jun-Gi Lee et al., "28.1 A Fully Integrated, Domino-Like-Buffered Analog LDO Achieving -28dB Worst-Case Power-Supply Rejection Across the Frequency Spectrum from 10Hz to 1GHz with 50pF On-Chip Capacitance," 2024 IEEE International Solid-State Circuits Conference (ISSCC), San Francisco, CA, USA, 2024, pp. 456-458.

* cited by examiner

*Primary Examiner* — Lakaisha Jackson
(74) *Attorney, Agent, or Firm* — CKC & Partners Co., LLC

(57) ABSTRACT

A regulator circuit includes a slow loop circuit and a fast loop circuit. The slow loop circuit includes an amplifier and a first transistor coupled between an output terminal and a first node. The first transistor adjusts a first voltage of the output terminal. The first voltage is configured as a regulated power source voltage. The fast loop includes multiple power circuits coupled in parallel between the output terminal and the first node. Each of the power circuits includes a power transistor coupled between a supply voltage and the output terminal. The power circuit adjusts a conductivity of the power transistor according to a second voltage of the first node to adjust the first voltage of the output terminal.

20 Claims, 4 Drawing Sheets

10

10

40

REGULATOR CIRCUIT

CROSS-REFERENCE TO RELATED APPLICATION

This application claims priority to Taiwan Application Serial Number 113139417, filed Oct. 16, 2024, which is herein incorporated by reference in its entirety.

BACKGROUND

Field of Invention

The present disclosure relates to a regulator circuit. More particularly, the present invention relates to a regulator circuit with a low-dropout voltage regulator.

Description of Related Art

Voltage regulator provides functions of converting an input voltage into an output voltage with a different voltage level, and keeping the output voltage stable. A low-dropout voltage regulator (LDO) is a linear regulator, which is used in application with little difference between input and output voltages and is suitable for medium or low power device. The power supply rejection ratio (PSRR) is a measure of the performance of the LDO. The PSRR describes the capability of the LDO to reject noise and voltage ripple from the power supply and maintain voltage stability. The LDO is important for audio circuit, analog to digital converting (ADC) circuit or digital to analog converting (DAC) circuit, and so on.

SUMMARY

In some embodiments, a regulator circuit is provided. The regulator circuit comprises a slow loop circuit and a fast loop circuit. The slow loop circuit comprises a first transistor and an amplifier. The first transistor is coupled between an output terminal and a first node and is configured to adjust a first voltage of the output terminal. The first voltage is configured as a power source voltage that is regulated. The fast loop circuit comprises power circuits coupled in parallel between the output terminal and the first node. Each one of the power circuits comprises a power transistor coupled between a supply voltage and the output terminal. The one of the power circuits is configured to adjust conductivity of the power transistor according to a second voltage of the first node to adjust the first voltage.

In some embodiments, a regulator circuit is provided. The regulator comprises a first transistor, an operational amplifier and a fast loop circuit. The first transistor is coupled between an output terminal of the regulator circuit and a first node. An output voltage at the output terminal is configured as a power source voltage that is regulated. The operational amplifier adjusts a voltage of a control terminal of the first transistor according to voltage value of a reference voltage to adjust the output voltage. The fast loop circuit comprises power circuits. The power circuits are coupled in parallel between the output terminal of the regulator circuit and the first node. The power circuits are configured to receive the supply voltage and adjust conductivity between the supply voltage and the output terminal of the regulator circuit according to a voltage of the first node to adjust the output voltage.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
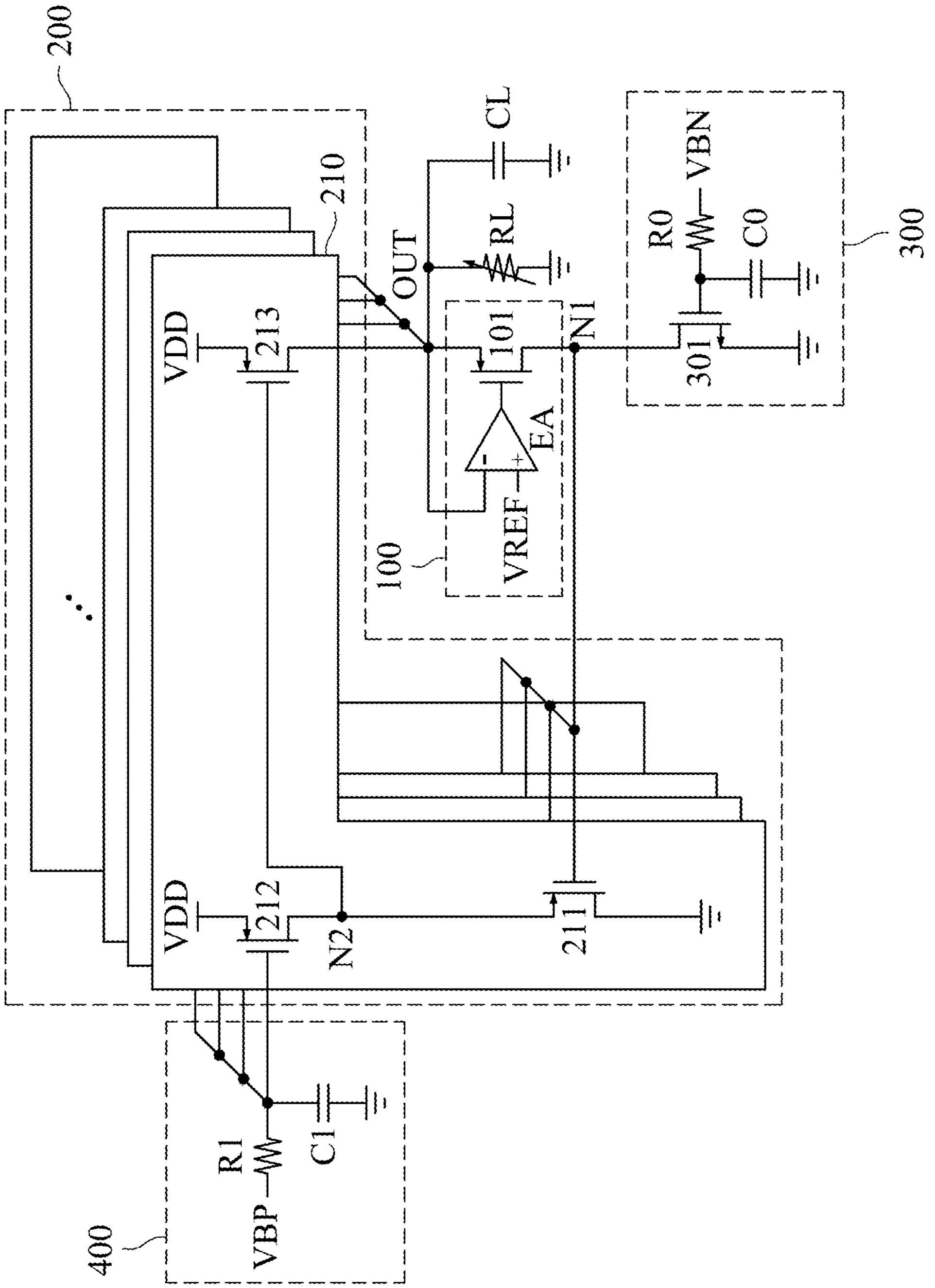
FIG. 1 is a schematic diagram of a circuit 10 in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term “and/or” includes any and all combinations of one or more of the associated listed items.

As used herein, “around”, “about”, “approximately” or “substantially” shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term “around”, “about”, “approximately” or “substantially” can be inferred if not expressly stated, or meaning other approximate values.

The present disclosure relates to low-dropout regulator (LDO) circuit. A LDO is used to convert a higher input voltage to a lower output voltage. According to some embodiments, the output voltage of a LDO can be served as a stable direct current (DC) power source.

Reference is now made to FIG. 1. FIG. 1 is a schematic diagram of a circuit 10 in accordance with some embodiments of the present disclosure. In application, the circuit 10 is a regulator device. In some embodiments, the circuit 10 is a LDO. In some embodiments, the circuit 10 is an integrated circuit (IC).

The circuit 10 is configured to receive a voltage VDD, convert the voltage VDD to a voltage VOUT and output the voltage VOUT as a power source of a load circuit at the output terminal OUT. In some embodiments, the voltage VDD is a power supply voltage. In some embodiments, the voltage VDD is a DC power source. In some embodiments, the voltage VDD is higher than the ground voltage.

The circuit 10 provided by the present disclosure is for reducing the power supply rejection ratio (PSRR). In some embodiments, the PSRR of the circuit 10 is defined as shown below.

$$PSRR = 20\log_{10}\left(\frac{\Delta VDD}{\Delta VOUT}\right)\text{ dB}$$

ΔVDD denotes change in the voltage VDD. ΔVDD denotes change in the voltage VOUT. The PSRR implies a ratio of the change in the voltage VDD to the change in the voltage VOUT. The unit of the PSRR is decibel (dB). Greater PSRR indicates better ability of reducing power ripple or noise.

For illustration, the circuit 10 includes a slow loop circuit 100, a fast loop circuit 200, a constant current circuit 300, a low pass filter bias circuit 400, an output capacitor CL and a load resistor RL.

The slow loop circuit 100 is coupled to the output terminal OUT of the circuit 10. The slow loop circuit 100 is configured to regulate the voltage VOUT to make the voltage VOUT have the target voltage value v1. The target voltage value v1 is the power supply voltage value that the circuit 10 is configured to provide.

In some embodiments, the slow loop circuit 100 is configured to adjust the voltage VOUT at the output terminal OUT according to a reference voltage VREF. In some embodiments, the voltage value of the reference voltage VREF is equal to the target voltage value v1. Specifically, when the slow loop circuit 100 determines that the voltage VOUT is higher than the reference voltage VREF, the slow loop circuit 100 pulls low the voltage VOUT. On the contrary, when the slow loop circuit 100 determines that the voltage VOUT is lower than the reference voltage VREF, the slow loop circuit 100 pulls high the voltage VOUT.

The slow loop circuit 100 is coupled to the constant current circuit 300. Specifically, as shown in FIG. 1, the slow loop circuit 100 and the constant circuit 300 are coupled to each other at a node N1. The output terminal OUT is coupled to the ground through the slow loop circuit 100, the node N1 and the constant current circuit 300. In some embodiments, the slow loop circuit 100 is configured to adjust its conductivity between the output terminal OUT and the node N1 to adjust the voltage VOUT. In some embodiments, the constant current circuit 300 provides the current flowing through the output terminal OUT, the node N1 to the ground. In some embodiments, the ground has a voltage value of zero volts.

In some embodiments, the slow loop circuit 100 includes a transistor 101 and an amplifier EA. In some embodiments, the transistor 101 is a p type metal-oxide semiconductor field effect transistor (PMOS). The amplifier EA is an operational amplifier (OP amp). In some embodiments, the amplifier EA is an error amplifier.

As shown in FIG. 1, the amplifier EA has a positive input terminal, a negative input terminal and an output terminal. The amplifier EA generates a voltage at the output terminal of the amplifier EA according to the difference between voltages at the positive and negative input terminals. For example, the amplifier EA subtracts the voltage value at the negative input terminal from the voltage value at the positive input terminal to generate the difference value. The amplifier EA generates the voltage at the output terminal of the amplifier EA according to the difference value. The voltage value at the output terminal is equal to the difference value or proportional to the difference value.

The negative input terminal of the amplifier EA is coupled to the output terminal OUT. The positive input terminal of the amplifier EA is coupled to the reference voltage VREF. A control terminal (e.g., gate terminal) of the transistor 101 is coupled to the output terminal of the amplifier EA. A first terminal (e.g., source terminal) of the transistor 101 is coupled to the output terminal OUT. A second terminal (e.g., drain terminal) of the transistor 101 is coupled to the node N1.

In operation, the amplifier EA compares the voltage VOUT at the output terminal OUT and the reference voltage VREF and adjusts the voltage at the control terminal of the transistor 101 according to the difference between the voltage VOUT and the reference voltage VREF. The conductivity of the transistor 101 is changed according to the voltage at the control terminal of the transistor 101. The voltage VOUT is changed according to the conductivity of the transistor 101.

For example, when the difference of the value of the reference voltage VREF subtracted by the value of the voltage VOUT increases, the voltage outputted by the amplifier EA increases. The conductivity of the transistor 101 decreases in response to that the voltage outputted by the amplifier 101 increases. The voltage VOUT increases in response to that the conductivity of the transistor 101 decreases. On the contrary, when the difference of the value of the reference voltage VREF subtracted by the value of the voltage VOUT decreases, the voltage outputted by the amplifier EA decreases. The conductivity of the transistor 101 increases in response to that the voltage outputted by the amplifier 101 decreases. The voltage VOUT decreases in response to that the conductivity of the transistor 101 increases.

In some embodiments, the constant current circuit 300 includes a transistor 301, the resistor R0 and a capacitor C0. In some embodiments, the transistor 301 is n type metal-oxide semiconductor field effect transistor (NMOS).

As shown in FIG. 1, a first terminal (e.g., source terminal) of the transistor 301 is coupled to the ground. A second terminal (e.g., drain terminal) of the transistor 301 is coupled to the node N1. The resistor R0 is coupled between a control terminal (e.g., gate terminal) of the transistor 301 and a voltage VBN. The capacitor C0 is coupled between the control terminal of the transistor 301 and the ground. The resistor R0 and the capacitor C0 are configured as a low pass filter between the voltage VBN and the transistor 301 to provide a bias to the transistor 301. The transistor 301 is turned on in response to the bias to direct a current from the node N1 to the ground. In some embodiments, the voltage VBN is a bias.

The output capacitor CL and the load resistor RL are coupled in parallel between the output terminal OUT and the ground. The load resistor RL is a load resistor of the circuit 10. The load resistor RL represents the load impedance of the circuit coupled to the output terminal OUT. In some embodiments, the load resistor alters in different circuit applications. The output capacitor CL filters out the ripple at the output terminal OUT.

The fast loop circuit 200 is coupled to the output terminal OUT and the slow loop circuit 100. The fast loop circuit 200 adjusts the voltage VOUT in response to the voltage transient at the output terminal OUT. Specifically, when the voltage VOUT increases, the fast loop circuit 200 pulls low the voltage VOUT. When the voltage VOUT decreases, the fast loop circuit 200 pulls high the voltage VOUT.

According to some embodiments, compared with the slow loop circuit 100, the fast loop circuit 200 has faster responding speed. Specifically, the fast loop circuit 200 adjusts the voltage VOUT according to voltage change of the output terminal OUT faster. Accordingly, when a large instantaneous voltage change occurs at the output terminal OUT, the circuit 10 adjusts the voltage VOUT through the fast loop circuit 200 immediately.

In some embodiments, the fast loop circuit 200 is coupled to the node N1 and adjusts the voltage VOUT in response to the voltage change at the node N1.

In some embodiments, the fast loop 200 includes multiple power circuits 210. The power circuits 210 are coupled in parallel between the node N1 and the output terminal OUT. Each power circuit 210 includes a transistor 211, a transistor 212 and a transistor 213. In some embodiments, the transistor 211, the transistor 212 and the transistor 213 are PMOSs. In some embodiments, the transistor 213 is a power MOS.

As shown in FIG. 1, a control terminal (e.g., gate terminal) of the transistor 211 is coupled to the node N1. A first terminal (e.g., source terminal) of the transistor 211 is coupled to a node N2 of the respective circuit 210. A second terminal (e.g., drain terminal) of the transistor 211 is coupled to the ground.

A control terminal (e.g., gate terminal) of the transistor 213 is coupled to the node N2. A first terminal (e.g., source terminal) of the transistor 213 is coupled to the voltage VDD. A second terminal (e.g., drain terminal) of the transistor 213 is coupled to the output terminal OUT.

The transistor 211 and the transistor 212 are coupled in series between the voltage VDD and the ground. The transistor 212 provides the current flowing from the node N2 to the ground to generate the voltage at the node N2 between the transistors 211 and 212, in which the current flows through the transistor 211.

The transistor 211 adjusts the voltage value at the node N2 according to the voltage value at the node N1. According to some embodiments, the transistor 211 is used as a source follower, in which voltage change of the source terminal of the transistor 211 follows voltage change of the gate terminal of the transistor 211. In some embodiments, the conductivity of the transistor 211 decreases in response to that the voltage at the node N1 increases. The voltage at the node N2 increases in response to that the conductivity of the transistor 211 decreases. On the contrary, the conductivity of the transistor 211 increases in response to that the voltage at the node N1 decreases. The voltage at the node N2 decreases in response to that the conductivity of the transistor 211 increases.

The conductivity of the transistor 212 is according to the bias provided by the low pass filter bias circuit 400 to the control terminal of the transistor 212. In some embodiments, the low pass filter bias circuit 400 includes a resistor R1 and a capacitor C1. The resistor R1 is coupled between the control terminal of the transistor 212 of the respective power circuit 210 and a bias VBP. The capacitor C1 is coupled between the control terminal of the transistor 212 of the respective power circuit 210 and the ground. The resistor R1 and the capacitor C1 are configured as a low pass filter between the bias VBP and the transistor 212 to provide a bias to the transistor 212. The transistor 212 is turned on in response to the bias received to generate the voltage at the node N2. In some embodiments, the voltage VBP is a bias.

The transistor 213, the slow loop circuit 100 and the constant current circuit 300 are coupled between the voltage VDD and the ground and generate the voltage VOUT at the output terminal OUT through a slow loop. The transistor 213 is turned on according to the voltage at the node N2. Specifically, the conductivity of the transistor 213 decreases in response to that the voltage at the node N2 increases. The voltage VOUT decreases in response to that the conductivity of the transistor 211 decreases. The conductivity of the transistor 211 increases in response to that the voltage at the node N1 decreases. The voltage at the node N2 decreases in response to that the conductivity of the transistor 211 increases.

In some embodiments, compared with the slow loop circuit 100, the fast loop circuit 200 aims to reduce high frequency voltage ripple or noise from the voltage VDD.

With the configurations of the transistors 211 to 213 in the fast loop circuit 200, when the voltage VDD has frequency ripple, the voltage at the node N2 follows the ripple of the voltage VDD. For example, when the voltage VDD changes at high frequency, the high frequency change of the voltage VDD can be reflected at the voltage of the node N2 because the bias provided by the low pass filter bias circuit 400 to the gate terminal of the transistor 212 is a relatively constant voltage. Accordingly, the voltage at the gate terminal of the transistor 213 follows the high frequency change of the voltage VDD to prevent the voltage at the output terminal OUT from affected by the high frequency change of the voltage VDD. As a result, the PSRR is improved.

According to some embodiments, through the voltage at the node N2 following the change of the voltage VDD, the power circuit 210 keeps the difference between voltages at the source and gate terminals of the transistor 213 fixed in order to keep the voltage VOUT having the target voltage value v1. As a result, the PSRR is improved. In some embodiments, the voltage change at the node N2 is equal to the voltage change of the voltage VDD, and the difference between the voltages at the source and gate terminals of the transistor 213 is zero.

Through coupling multiple power circuit 210 in parallel, the gate parasitic capacitance of the power transistor (e.g., transistor 213) at the node N2 is reduced, and the pole corresponding to the node N2 moves toward high frequency portion in a Bode plot. Accordingly, the stability of the circuit 10 is enhanced. In addition, the reduction of the parasitic capacitance corresponding to the node N2 helps the voltage at the node N2 following the change of the voltage VDD at high frequency in order to improve the PSRR of the circuit 10.

Compared with some approaches, the structure of multiple power circuit 210 coupled in parallel prevents power transistors from being coupled in series. Accordingly, the accumulation of the offset voltage throughout the power transistors and the problem of the defect caused by the current difference among the power transistors are avoided.

Figure 2:
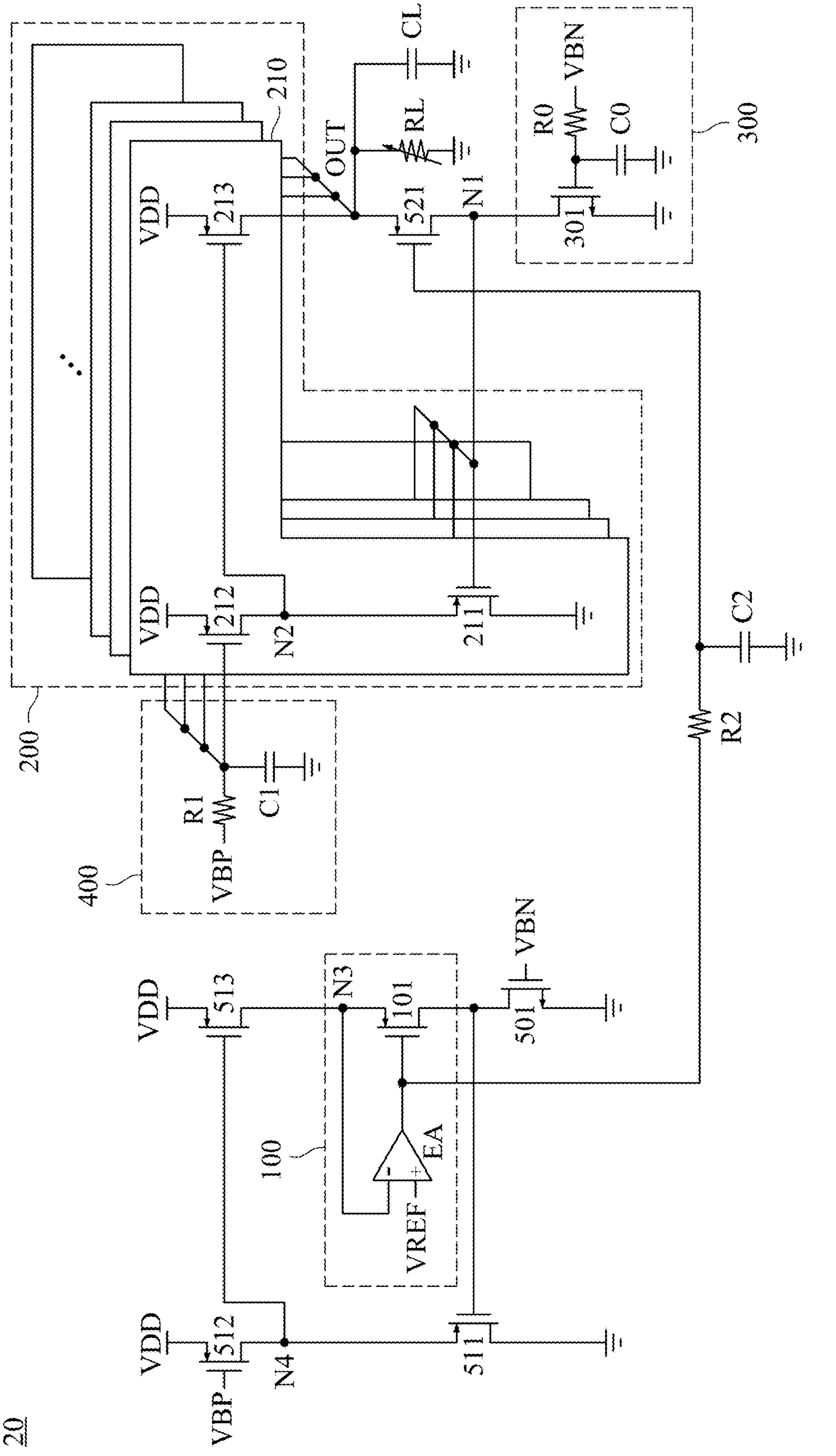
FIG. 2 is a schematic diagram of a circuit 20 configured with respect to the circuit 10 of FIG. 1, in accordance with some embodiments of the present disclosure.

Reference is now made to FIG. 2. FIG. 2 is a schematic diagram of a circuit 20 configured with respect to the circuit 10 of FIG. 1, in accordance with some embodiments of the present disclosure. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity.

Compared with the circuit 10 of FIG. 1, the circuit 20 of FIG. 20 further includes a transistor 501, transistors 511-513, a transistor 521, a resistor R2 and a capacitor C2. In some embodiments, the transistor 501 is a NMOS. The transistors 511-513 and 521 are PMOSs. The transistor 513 is a power MOS.

For illustration, different from the slow loop circuit 100 of the circuit 10, the slow loop circuit 100 of the circuit 20 is coupled between the transistors 501 and 513. As shown in FIG. 2, a first terminal (e.g., source terminal) of the transistor 101 is coupled to a node N3 between the transistors 101 and 513. A second terminal (e.g., drain terminal) of the transistor 101 is coupled to a first terminal (e.g., drain terminal) of the transistor 501. A second terminal (e.g., source terminal) of the transistor 501 is coupled to the ground.

The negative input terminal of the amplifier EA is coupled to the node N3. The positive input terminal of the amplifier EA is coupled to the reference voltage VREF. The output terminal of the amplifier EA is coupled to the control terminal (e.g., gate terminal) of the transistor 101.

The control terminal (e.g., gate terminal) of the transistor 511 is coupled to the second terminal of the transistor 101 and the first terminal of the transistor 501. A first terminal (e.g., source terminal) of the transistor 511 is coupled to the node N4. A second terminal (e.g., drain terminal) of the transistor 511 is coupled to the ground.

A control terminal (e.g., gate terminal) of the transistor 512 is coupled to the voltage VBP. A first terminal (e.g., source terminal) of the transistor 512 is coupled to the voltage VDD. A second terminal (e.g., drain terminal) of the transistor 512 is coupled to the node N4.

A control terminal (e.g., gate terminal) of the transistor 513 is coupled to the node N4. A first terminal (e.g., source terminal) of the transistor 513 is coupled to the voltage VDD. A second terminal (e.g., drain terminal) of the transistor 512 is coupled to the node N3.

A first terminal (e.g., source terminal) of the transistor 521 is coupled to the output terminal OUT. A second terminal (e.g., drain terminal) of the transistor 521 is coupled to the constant current circuit 300. For example, the second terminal of the transistor 521 is coupled to a second terminal (e.g., drain terminal) of the transistor 301.

The resistor R2 is coupled between a control terminal (e.g., gate terminal) of the transistor 521 and the output terminal of the amplifier EA. The capacitor C2 is coupled between the ground and the control terminal of the transistor 521.

In operation, different from the slow loop circuit 100 of the circuit 10, the slow loop circuit 100 of the circuit 20 adjusts the voltage at the node N3 and the voltage VOUT simultaneously according to a comparison between the voltage VREF and the voltage at the node N3.

Specifically, the amplifier EA compares the voltage at the node N3 and the reference voltage VREF and generates the output voltage of the amplifier EA according to the difference the voltage at the node N3 and the reference voltage. The conductivity of the transistor 101 changes according to the output voltage of the amplifier EA. The voltage at the node N3 is according to the conductivity of the transistor 101.

In addition, the control terminal of the transistor 521 receives the output voltage of the amplifier EA through the resistor R2. The conductivity of the transistor 521 changes according to the output voltage of the amplifier EA. The voltage VOUT changes according to the conductivity of the transistor 521.

For example, when the difference corresponding to the value of the reference voltage VREF subtracted by the value of the voltage at the node N3 increases, the output voltage of the amplifier EA increases. The conductivity of the transistors 101 and 521 decrease in response to that the output voltage of the amplifier EA increases. The voltage at the node N3 and the voltage VOUT increase in response to that the conductivity of the transistor 101 decreases. On the contrary, when the difference corresponding to the value of the reference voltage VREF subtracted by the value of the voltage at the node N3 decreases, the output voltage of the amplifier EA decreases. The conductivity of the transistors 101 and 521 increase in response to that the output voltage of the amplifier EA decreases. The voltage at the node N3 and the voltage VOUT decrease in response to that the conductivity of the transistor 101 increases.

The transistors 511-513 cooperate to adjust the voltage at the node N3. The operations of the transistors 511-513 are similar to the operations of the transistors 211-213 respectively. The difference between the operations of the transistors 511-513 and the transistors 211-213 is that the transistors 511-513 are configured to adjust the voltage of the node N3.

For example, the transistor 512 is turned on in response to the voltage VBP. The transistor 511 adjusts the voltage at the node N4 according to the voltage between the transistor 101 and the transistor 501. The voltage at the node N4 follows the change of the voltage VDD through the transistor 512 to adjust the voltage at the node N4.

In addition, the resistor R2 and the capacitor C2 are configured as a low pass filter between the amplifier EA and the transistor 521 to filter out the noise from the amplifier EA.

Figure 3:
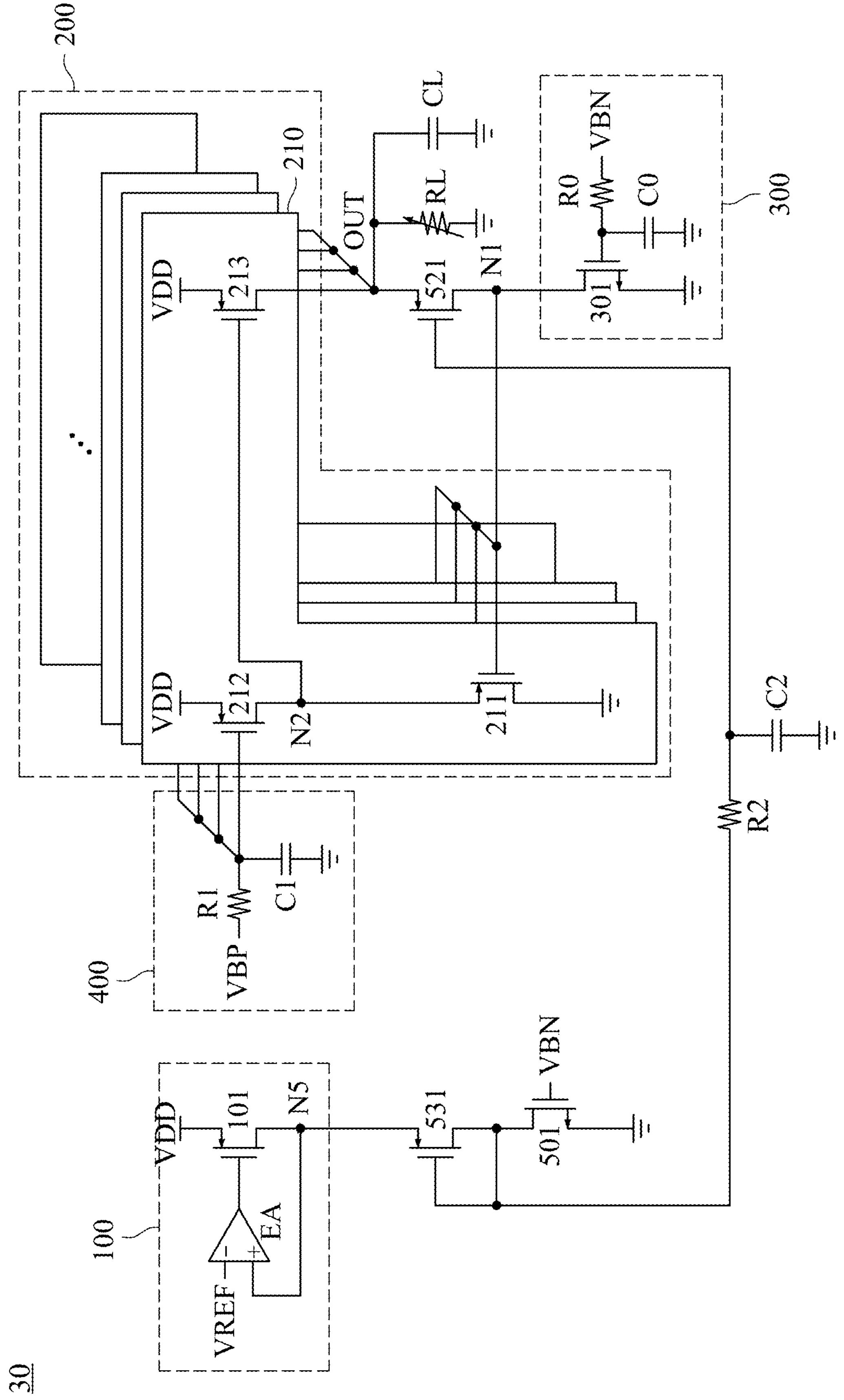
FIG. 3 is a schematic diagram of a circuit 30 configured with respect to the circuits 10 and 20 of FIGS. 1-2, in accordance with some embodiments of the present disclosure.

Reference is now made to FIG. 3. FIG. 3 is a schematic diagram of a circuit 30 configured with respect to the circuits 10 and 20 of FIGS. 1-2, in accordance with some embodiments of the present disclosure. With respect to the embodiments of FIGS. 1-2, like elements in FIG. 3 are designated with the same reference numbers for ease of understanding.

Compared with the circuit 20 of FIG. 2, the circuit 30 of FIG. 3 further includes a transistor 531. In some embodiments, the transistor 531 is a PMOS.

Different from the slow loop circuit 100 of the circuit 20, the slow loop circuit 100 of the circuit 30 is coupled between the voltage VDD and the transistor 531. For example, as shown in FIG. 3, a first terminal (e.g., source terminal) of the transistor 101 is coupled to the voltage VDD. A second terminal (e.g., drain terminal) of the transistor 101 is coupled to the node N5. The negative input terminal of the amplifier EA is coupled to the reference voltage VREF. The positive input terminal of the amplifier EA is coupled to the node N5.

A first terminal (e.g., source terminal) of the transistor 531 is coupled to the node N5. A second terminal (e.g., drain terminal) of the transistor 531 is coupled to a first terminal (e.g., drain terminal) of the transistor 501. A control terminal (e.g., gate terminal) of the transistor 531 is coupled to the second terminal of the transistor 531 and the resistor R2.

In operation, different from the slow loop circuit 100 of the circuit 20, the slow loop circuit 100 of the circuit 30 adjusts the voltage at the node N5 to keep the voltage VOUT having the target voltage value v1 according to a comparison between the reference voltage VREF and the voltage at the node N5.

For example, when the reference voltage VREF decreases and the difference corresponding to the voltage value of the node N5 subtracted by the value of the reference voltage VREF increases, the output voltage of the amplifier EA increase. The conductivity of the transistor 101 decreases in response to that the output voltage of the amplifier EA increases. The voltage at the node N5 decreases in response to the conductivity of the transistor 101 decreases. When the voltage of the control terminal of the transistor 521 decreases, the conductivity of the transistor 521 increases. The voltage VOUT decreases in response to that the conductivity of the transistor 521 increases.

On the contrary, when the reference voltage VREF increases and the difference corresponding to the voltage value of the node N5 subtracted by the value of the reference voltage VREF decreases, the output voltage of the amplifier EA decreases. The conductivity of the transistor 101 increases in response to that the output voltage of the amplifier EA decreases. The voltage at the node N5 increases in response to the conductivity of the transistor 101 increases. When the voltage of the control terminal of the transistor 521 increases, the conductivity of the transistor 521 decreases. The voltage VOUT increases in response to that the conductivity of the transistor 521 decreases.

According to some embodiments, the slow loop circuit 100 of the circuits 20 and 30 are coupled to the transistor 521 through the low pass filter. Therefore, with less noise, the requirements of the amplifier of the circuits 20 and 30 are less strict and the circuit area can be reduced.

Figure 4:
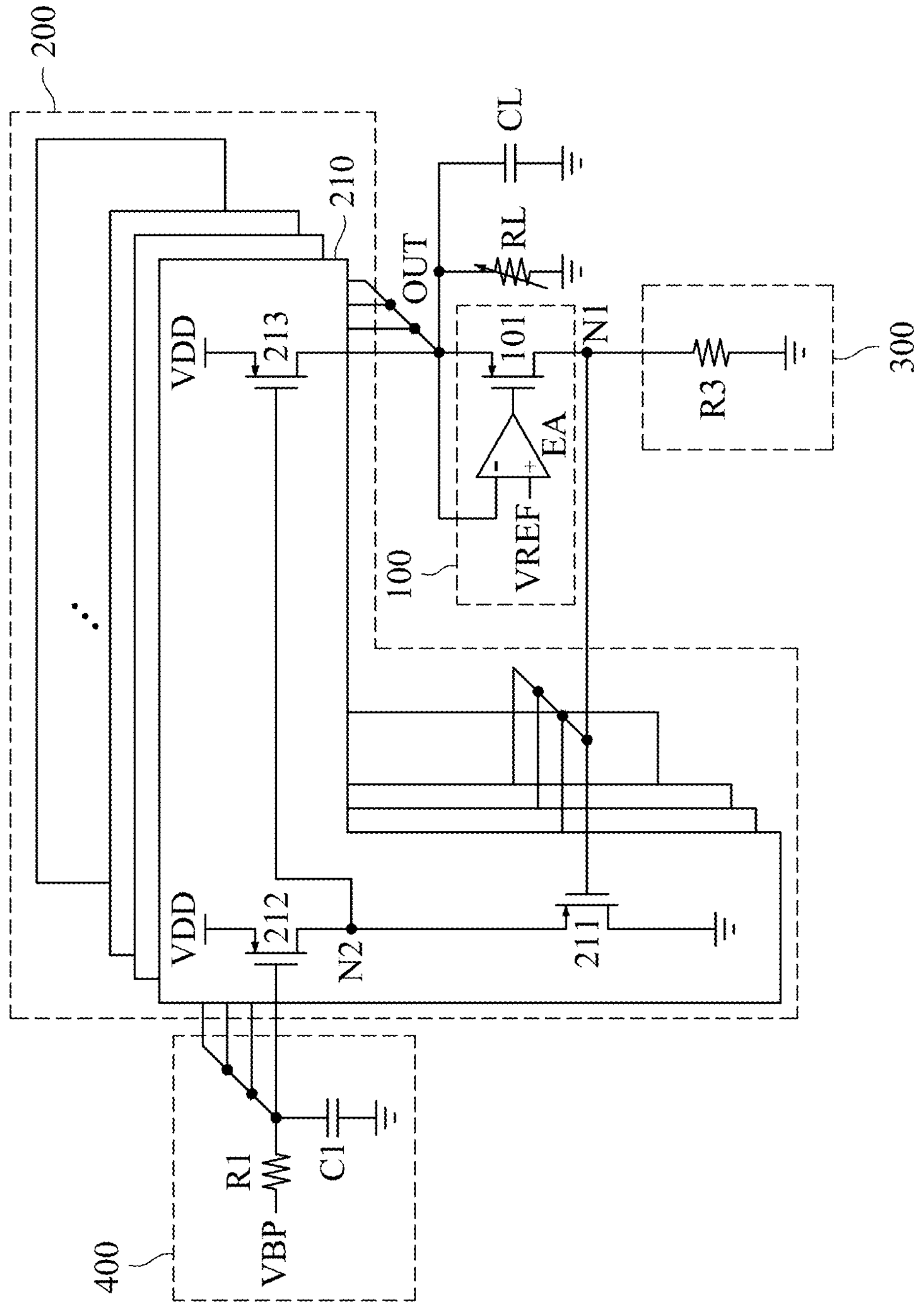
FIG. 4 is a schematic diagram of a circuit 40 configured with respect to the circuits 10, 20 and 20 of FIGS. 1-3, in accordance with some embodiments of the present disclosure.

Reference is now made to FIG. 4. FIG. 4 is a schematic diagram of a circuit 40 configured with respect to the circuits 10, 20 and 30 of FIGS. 1-3, in accordance with some embodiments of the present disclosure. With respect to the embodiments of FIGS. 1-3, like elements in FIG. 4 are designated with the same reference numbers for ease of understanding.

According to some embodiments, the constant current circuit 300 of the circuits 10, 20 and 30 of FIGS. 1-3 includes a resistor R3 instead of the transistor 301, the resistor R0 and the capacitor C0. The resistor R3 is coupled between the node N1 and the ground.

The configurations of FIGS. 1-4 are given for illustrative purposes. Various implements are within the contemplated scope of the present disclosure. For example, in some embodiments, the amount of the power circuits 210 in the fast loop circuit 200 is less than four. For example, the fast loop circuit 200 includes three power circuits 210 coupled in parallel.

In summary, a regulator circuit is provided. The regulator circuit utilizes a structure of feedback control loop to regulate the output voltage. The regulator circuit has the slow loop circuit that inhibits low frequency power source ripple and noise. The regulator circuit further has the fast loop circuit that inhibits high frequency power source ripple and noise. Through coupling multiple source followers and power transistors in parallel, the fast loop circuit has better power source following ability at high frequency, which help improve the PSRR of the regulator circuit.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A regulator circuit, comprising:

a slow loop circuit comprising:

a first transistor that is coupled between an output terminal and a first node and is configured to adjust a first voltage of the output terminal, wherein the first voltage is configured as a power source voltage that is regulated; and a fast loop circuit comprising:

a plurality of power circuits coupled in parallel between the output terminal and the first node, wherein each one of the power circuits comprises:

a power transistor coupled between a supply voltage and the output terminal, wherein the one of the power circuits is configured to adjust conductivity of the power transistor according to a second voltage of the first node to adjust the first voltage.

2. The regulator circuit of claim 1, further comprising:

a constant current circuit configured to provide a constant current flowing through the first transistor, wherein the constant current circuit comprises:

a second transistor coupled between the first node and a ground;

a first resistor coupled between a first bias and a control terminal of the second transistor; and a first capacitor coupled between the ground and a control terminal of the second transistor.

3. The regulator circuit of claim 1, wherein the slow loop circuit further comprises:

an amplifier coupled to the output terminal and a reference voltage, wherein an output terminal of the amplifier is coupled to a control terminal of the first transistor 101, wherein the amplifier is configured to adjust conductivity of the first transistor according to a comparison between the first voltage and the reference voltage to adjust the first voltage.

4. The regulator circuit of claim 3, wherein a negative input terminal of the amplifier is coupled to the output terminal, and a positive terminal of the amplifier is coupled to the reference voltage, wherein the amplifier adjusts a voltage of the control terminal of the first transistor according to a value of the reference voltage subtracted by the first voltage.

5. The regulator circuit of claim 1, wherein the power circuit further comprises:

a second transistor and a third transistor that are coupled in series between the supply voltage and a ground, wherein a control terminal of the power transistor is coupled to a second node between the second transistor and third transistor, wherein the second transistor adjusts a voltage of the second node according to the second voltage to adjust the conductivity of the power transistor.

6. The regulator circuit of claim 5, wherein the second transistor increases the voltage of the second node in response to the second voltage increasing to decrease the first voltage.

7. The regulator circuit of claim 5, further comprising:
a low pass filter bias circuit configured to provide a bias to each one of the power circuits, wherein the low pass filter bias circuit comprises:
a first resistor coupled between a third voltage and a control terminal of the third transistor of each one of the power circuits; and
a first capacitor coupled between a ground and the control terminal of the third transistor of each one of the power circuits.

8. The regulator circuit of claim 5, wherein the first to third transistors and the power transistor has a same conductive type.

9. A regulator circuit, comprising:
a first transistor coupled between an output terminal of the regulator circuit and a first node, wherein an output voltage at the output terminal is configured as a power source voltage that is regulated;
an operational amplifier configured to adjust a voltage of a control terminal of the first transistor according to ripple of a supply voltage to adjust the output voltage; and
a fast loop circuit comprising a plurality of power circuits, wherein the power circuits are coupled in parallel between the output terminal of the regulator circuit and the first node,
wherein the power circuits are configured to receive the supply voltage and adjust conductivity between the supply voltage and the output terminal of the regulator circuit according to a voltage of the first node to adjust the output voltage.

10. The regulator circuit of claim 9, further comprising:
a first resistor coupled between the operational amplifier and the control terminal of the first transistor; and
a first capacitor coupled between a ground and the control terminal of the first transistor, wherein the first resistor and the first capacitor are configured to filter a signal from the operational amplifier.

11. The regulator circuit of claim 9, further comprising:
a first resistor coupled between the first node and a ground, wherein the first resistor is configured to provide a current flowing through the first transistor.

12. The regulator circuit of claim 9, further comprising:
a first power transistor coupled between the supply voltage and a second node; and
a second transistor coupled to the first power transistor, wherein a control terminal of the second transistor is coupled to an output terminal of the operational amplifier,
wherein the operational amplifier adjusts a voltage of the output terminal according to a voltage of the second node and a reference voltage to adjust the voltage of the second node.

13. The regulator circuit of claim 12, further comprising:
a third transistor coupled to a ground and a control terminal of the first power transistor, wherein conductivity of the third transistor is according to a voltage of a first terminal of the second transistor; and
a fourth transistor coupled between the supply voltage and the control terminal of the first power transistor, wherein the fourth transistor is turned on in response to a first bias.

14. The regulator circuit of claim 13, further comprising:
a fifth transistor that is coupled between the ground and the first terminal of the second transistor and is turned on according to a second bias different from the first bias.

15. The regulator circuit of claim 9, wherein the power circuit comprises:
a first power transistor coupled between the supply voltage and the output terminal of the regulator circuit; and
a second transistor coupled between a ground and a control terminal of the first power transistor,
wherein the first transistor is coupled between the output terminal of the regulator circuit and a control terminal of the second transistor.

16. The regulator circuit of claim 15, wherein the power circuit further comprises:
a third transistor coupled between the supply voltage and the control terminal of the first power transistor, wherein the first to third transistors are p type transistor.

17. The regulator circuit of claim 16, further comprising:
a low pass filter bias circuit comprising:
a first resistor coupled between a first voltage and a control terminal of the third transistor; and
a first capacitor coupled between a ground and the control terminal of the third transistor, wherein the first resistor and the first capacitor are configured to provide a bias to turn on the third transistor.

18. The regulator circuit of claim 9, further comprising:
a second transistor coupled between the supply voltage and a second node, wherein a first input terminal of the operational amplifier is coupled to a reference voltage, a second input terminal of the operational amplifier is coupled to the second node, and an output terminal of the operational amplifier is coupled to a control terminal of the second transistor; and
a third transistor, wherein a first terminal of the third transistor is coupled to the second node, a second terminal and a control terminal of the third transistor are coupled to the control terminal of the first transistor through a filter.

19. The regulator circuit of claim 18, wherein the operational amplifier is configured to adjust a voltage of the control terminal of the second transistor according to a difference between the reference voltage and a voltage of the second node to adjust conductivity of the second transistor.

20. The regulator circuit of claim 19, further comprising:
a fourth transistor coupled between the second node and a ground, wherein the fourth transistor is turned on according to a first bias,
wherein the first to third transistors have a first conductive type, and the fourth transistor has a second conductive type different from the first conductive type.

* * * * *